(12) United States Patent
Thaw

(10) Patent No.: US 8,630,954 B2
(45) Date of Patent: Jan. 14, 2014

(54) SYSTEM AND METHOD OF USING LOAD NETWORK TO ASSOCIATE PRODUCT OR SERVICE WITH A CONSUMER TOKEN

(71) Applicant: William A. Thaw, San Mateo, CA (US)

(72) Inventor: William A. Thaw, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 13/714,038

(22) Filed: Dec. 13, 2012

(65) Prior Publication Data

US 2013/0159029 A1    Jun. 20, 2013

Related U.S. Application Data

(63) Continuation-in-part of application No. 13/327,654, filed on Dec. 15, 2011.

(51) Int. Cl.
*G06Q 40/00* (2012.01)

(52) U.S. Cl.
USPC .............................................. 705/44; 705/30

(58) Field of Classification Search
USPC ...................................................... 705/10–44
See application file for complete search history.

(56) References Cited

U.S. PATENT DOCUMENTS

| | | | |
|---|---|---|---|
| 5,805,680 A * | 9/1998 | Penzias | 379/118 |
| 7,054,830 B1 * | 5/2006 | Eggleston et al. | 705/14.26 |
| 7,110,979 B2 * | 9/2006 | Tree | 705/39 |
| 7,146,338 B2 * | 12/2006 | Kight et al. | 705/42 |
| 7,527,208 B2 | 5/2009 | Hammad et al. | |
| 7,567,920 B2 | 7/2009 | Hammad et al. | |
| 7,856,377 B2 * | 12/2010 | Cohagan et al. | 705/14.3 |
| 7,860,753 B2 | 12/2010 | Walker et al. | |
| 7,866,551 B2 | 1/2011 | Manessis et al. | |
| 7,870,608 B2 | 1/2011 | Shraim et al. | |
| 7,886,969 B2 | 2/2011 | Antoo et al. | |
| 7,913,302 B2 | 3/2011 | Shraim et al. | |

(Continued)

FOREIGN PATENT DOCUMENTS

| | | |
|---|---|---|
| JP | 2002-015141 A | 1/2002 |
| JP | 2004-070911 A | 3/2004 |

(Continued)

OTHER PUBLICATIONS

The International Search Report and Written Opinion from PCT/US2012/069834, dated Apr. 12, 2013.

*Primary Examiner* — Frantzy Poinvil
(74) *Attorney, Agent, or Firm* — Kilpatrick Townsend & Stockton LLP

(57) ABSTRACT

Systems, devices, apparatuses, and methods for conducting a transaction in which a consumer purchases a product or a service by providing payment to a merchant whom is not the provider of the product or service. The invention permits a consumer to present cash or a payment device (such as a credit card or debit card) to a merchant, where that merchant may be an element of a load network or payment processing network. In a typical load network transaction, the merchant would accept the cash or payment device from the consumer and use the funds provided to "load" or recharge an account of the consumer. However, instead of this use of the network, embodiments of the invention operate to allow the consumer to provide the source of payment to the merchant for a product or service offered by a third party which is accessed by the consumer using a consumer token.

20 Claims, 5 Drawing Sheets

(56) References Cited

U.S. PATENT DOCUMENTS

| | | |
|---|---|---|
| 7,937,324 B2 | 5/2011 | Patterson |
| 7,992,781 B2 * | 8/2011 | Hammad ............... 235/380 |
| 8,010,417 B2 | 8/2011 | Walker et al. |
| 8,041,769 B2 | 10/2011 | Shraim et al. |
| 8,073,773 B2 * | 12/2011 | Kozee et al. ............... 705/40 |
| 8,118,223 B2 | 2/2012 | Hammad et al. |
| 8,190,523 B2 | 5/2012 | Patterson |
| 8,234,207 B2 | 7/2012 | Breitenbach et al. |
| 8,256,666 B2 | 9/2012 | Dixon et al. |
| 2001/0049643 A1 | 12/2001 | Davis |
| 2004/0024650 A1 | 2/2004 | Chen et al. |
| 2007/0125842 A1 | 6/2007 | Antoo et al. |
| 2008/0116264 A1 | 5/2008 | Hammad et al. |
| 2008/0128513 A1 | 6/2008 | Hammad et al. |
| 2008/0179393 A1 | 7/2008 | Antoo |
| 2008/0201212 A1 | 8/2008 | Hammad et al. |
| 2008/0203151 A1 | 8/2008 | Dixon et al. |
| 2008/0203152 A1 | 8/2008 | Hammad et al. |
| 2008/0203170 A1 | 8/2008 | Hammad et al. |
| 2008/0208681 A1 | 8/2008 | Hammad et al. |
| 2008/0243685 A1 | 10/2008 | Antoo |
| 2009/0063355 A1 | 3/2009 | Antoo et al. |
| 2009/0119213 A1 | 5/2009 | Hammad et al. |
| 2009/0121016 A1 | 5/2009 | Hammad et al. |
| 2009/0125323 A1 | 5/2009 | Lakshmanan et al. |
| 2009/0171682 A1 | 7/2009 | Dixon et al. |
| 2009/0184163 A1 | 7/2009 | Hammad et al. |
| 2009/0239512 A1 | 9/2009 | Hammad et al. |
| 2010/0089995 A1 | 4/2010 | El-Awady et al. |

FOREIGN PATENT DOCUMENTS

| | | |
|---|---|---|
| KR | 10-2001-0091744 A | 10/2001 |
| KR | 10-2003-0004739 A | 1/2003 |
| WO | 01/84504 A2 | 11/2001 |

* cited by examiner

SYSTEM AND METHOD OF USING LOAD NETWORK TO ASSOCIATE PRODUCT OR SERVICE WITH A CONSUMER TOKEN

CROSS-REFERENCE TO RELATED APPLICATIONS

The present application claims priority from and is a continuation-in-part of U.S. patent application Ser. No. 13/327,654, filed on Dec. 15, 2011, titled "SYSTEM AND METHOD OF USING LOAD NETWORK TO ASSOCIATE PRODUCT OR SERVICE WITH A CONSUMER TOKEN," by William A. Thaw, which is herein incorporated by reference in their entirety for all purposes.

FIELD OF THE INVENTION

Embodiments of the invention are directed to systems used to conduct and process payment transactions for products or services, and specifically, to a method and associated apparatus and system that may be used to associate a purchased product or service with a token using a load network. This permits either cash or a payment card to be presented to a merchant and used to purchase the product or service of a third party. Further, in some embodiments, a consumer's payment card account identifier may be used as a form of access token to enable the consumer to obtain the product or service at a site operated by the third party.

BACKGROUND

Consumers often wish to purchase a product or service in a way that is convenient for them based on their location, the time of day, the type of product or service, etc. Similarly, providers of products or services want to enable consumers to purchase the products or services in the most cost effective way for the providers, while making the products or services available to the greatest number of potential purchasers.

For example, an operator of a transit system may need to purchase and install ticket vending machines at transit locations in order to make transit tickets and passes available to consumers. These machines and the associate proprietary ticket distribution network are typically both expensive and limited in terms of the number of available purchase sites. A similar situation may exist for providers of tickets to other venues, such as concerts, sporting events, etc. In addition, sellers of certain goods may be limited (in terms of the number of units they can provide to consumers) by a limited sales channel since consumers may have to visit one site (or one of a small number of sites) in order to purchase the goods, and similarly may only be able to retrieve the goods from a small number of locations.

Therefore, as recognized by the inventor, it would be desirable to have a system whereby a consumer can pay for a product or service at a convenient location and then access that product or service at another location. This would permit a consumer to pay for a third party product or service at a merchant and then visit that third party to obtain the product or service (such as access to a venue or pick up of a product). Embodiments of the invention address these problems and other problems individually and collectively.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Embodiments of the invention are directed to systems, devices, apparatuses, and methods for allowing a consumer to purchase a product or service by providing payment to a merchant whom is not the provider of the product or service. Embodiments of the invention permit a consumer to present cash or a payment device (such as a credit card or debit card) to a merchant, where that merchant may be an element of a load network. Typically, the merchant would accept the cash or payment device from the consumer and use the funds provided to "load" or recharge a payment device or account of the consumer. In such cases the destination account for the provided funds (i.e., the account into which the funds are loaded) belongs to the consumer and is identified by an account number associated with a card belonging to the consumer. However, instead of this process, embodiments of the invention operate to allow the consumer to provide a source of payment to the merchant for a product or service offered by a third party. The merchant accepts the payment and, if required, obtains approval for the transaction, for example by using the process normally used to obtain authorization for a credit or debit card purchase.

The merchant then generates a load network message (or messages) that contain a routable identifier number for the product or service of the third party. The routable identifier serves to identify the "destination account" for the funds provided by the consumer. Thus instead of the load network message containing an identifier for a consumer account into which the funds are to be deposited, the data in a data field that normally contains the consumer account identifier is replaced by a product or service identifier (which is represented in a similar format to that used for the consumer account identifier). This allows a load message to function as an instruction to credit a certain amount of funds to the purchase of a specific product or service, where that product or service is provided by a party other than the one to whom the consumer has provided the funds. The invention also allows any merchant that is part of (or is capable of exchanging messages with) a load network or payment processing network to act as a site where consumers can purchase and pay for products or services that are provided by other sources. This increases the sales channel for the providers of those products or services while limiting their up-front costs, and provides added convenience for consumers.

In addition to the product or service identifier, the load message (or messages) may contain data identifying the consumer, such as an account number associated with the consumer's credit card or debit card. Upon receipt of the message (or messages) the third party is able to record the purchase of the product or service by the consumer and store the consumer identification data. When the consumer visits the third party (or another party designated by the third party), the consumer is able to provide the identification data (such as by swiping their credit card or debit card). In return, the consumer is able to take possession of the product or obtain access to the service. Example services that may be accessed using embodiments of the invention include transit services, tickets for a concert or sporting event, or access to another type of venue.

In some embodiments, the invention is directed to a method of enabling a consumer to purchase a product or service, where the method includes:

receiving payment for the product or service from the consumer at a merchant, the merchant being an entity other than the provider of the product or service;

receiving identification data from the consumer;

operating an electronic data processor to generate an electronic message in a format transportable over a load network or payment processing network, the message including data identifying the provider of the product or service, data identifying the product or service, and data identifying the consumer; and providing the generated message to the load network or payment processing network.

In some embodiments, the invention is directed to a method of enabling a consumer to purchase a product or service, where the method includes:

receiving a message over a load network or payment processing network;

operating an electronic data processor to determine, based on data contained in the message, the product or service that the consumer has paid to purchase;

operating the electronic data processor to determine, based on data contained in the message, identification data for the consumer;

receiving identification data from a person wanting to obtain the product or service;

comparing the identification data for the consumer to the identification data received from the person; and based on the comparison, providing the product or service to the person.

In some embodiments, the invention is directed to one or more computer-readable media collectively having thereon computer-executable instructions that, when executed by one or more computers cause the one or more computers to collectively, at least generate an electronic message in a format transportable over a load network or payment processing network, the message including data identifying the provider of a product or service, data identifying the product or service, and data identifying a consumer wanting to purchase the product or service;

provide the generated message to the load network or payment processing network;

receive the message over the load network or payment processing network;

process the received message to determine, based on data contained in the message, the product or service that the consumer has paid to purchase; and process the received message to determine, based on data contained in the message, identification data for the consumer.

Other objects and advantages of the present invention will be apparent to one of ordinary skill in the art upon review of the detailed description of the present invention and the included figures.

BRIEF DESCRIPTION OF THE DRAWINGS

Illustrative embodiments of the present invention are described in detail below with reference to the following drawing figures.

DETAILED DESCRIPTION

Figure 1:
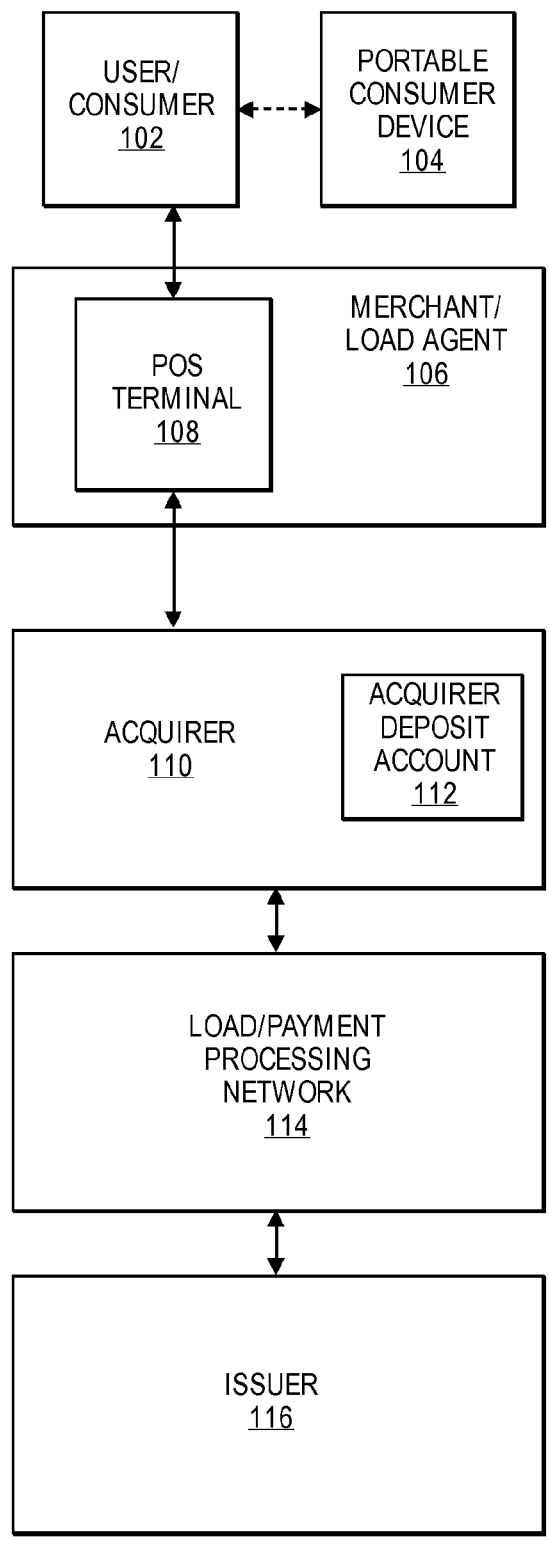
FIG. 1 is a diagram illustrating the components and operation of a load network that may be used, adapted for use, or used in conjunction with a payment processing network in implementing an embodiment of the invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention are directed to systems, devices, apparatuses, and methods for conducting a transaction in which a consumer purchases goods, a product, or a service (hereinafter "a product or service" or "products or services") by providing payment to a merchant whom is not the provider of the product or service. Embodiments of the invention permit a consumer to present cash or a payment device (such as a credit card or debit card) to a merchant, where that merchant may be an element of a load network. In a typical load network transaction, the merchant would accept the cash or payment device from the consumer and use the funds provided to "load" or recharge a payment device or account of the consumer. In such cases the destination account for the provided funds (i.e., the account into which the funds are loaded) belongs to the consumer and is identified by an account number associated with a card belonging to the consumer. However, instead of this use of the network, embodiments of the invention operate to allow the consumer to provide the source of payment to the merchant for a product or service offered by a third party.

The merchant accepts the payment and, if required, obtains approval for the payment transaction. Such an approval would be obtained, for example, if the payment was in the form of a credit card or debit card. In that situation the merchant would generate a transaction authorization request message which would be routed and processed in a similar way to a credit card or debit card purchase transaction. After receiving approval of the payment (or accepting cash as the source of payment), the merchant uses the load network to conduct a second transaction in which funds are transferred to an account associated with the third party as payment for the product or service.

In some embodiments, the merchant generates a load network message (or messages) that contain a routable identifier number for the product or service of the third party that the consumer wishes to purchase. The third party product or service may be identified by a SKU (a stock-keeping unit, which is a number or code used to identify each unique product or item for sale in a store or other business), where the SKU is in a format that is routable over the load network. For example, the SKU format may include an identifier of the third party which is the source of the product or service (in a format such as that used to identify a bank or issuer of a payment account (BIN)) along with an identifier of the specific product or service available from the third party which the consumer is purchasing (in a format such as that used to identify a consumer's account). Thus, in this example the SKU is in a format such as that used to identify a BIN/PAN combination of data and is routable or transportable over a payment processing network or load network (which may be part of the same data transport and processing network).

The routable product or service identifier (either alone or in combination with the third party identifier) serves to identify the "destination account" for the funds provided by the consumer. Thus instead of the load network message containing an identifier for a consumer account into which the funds are to be deposited, the data in a data field that normally contains the consumer account identifier is replaced by a product or service identifier (which is represented in a similar format to that used for the consumer account identifier). This allows a load message to function as an instruction to credit a certain amount of funds to the purchase of a specific product or service, where that product or service is provided by a party other than the one to whom the consumer has provided the funds (and which may be identified by other data in the load message).

In addition, the load message (or messages) may contain data identifying the consumer, such as an account number associated with the consumer's credit card, debit card, or membership card. Upon receipt of the message (or messages) the third party is able to record the purchase of the product or service by the consumer and store the consumer identification data. As used herein a "token" refers to the consumer identification information which is included in the load message, and which the consumer can later present to the provider to obtain the purchased product or service. As discussed above this identification information can include a credit or debit card number, or an identifier associated with a provider-specific device such as a transit device or transit card which can be used to obtain access to a transit system. When the consumer visits the third party or another party designated by the third party, the consumer is able to provide the identification data (such as by swiping their credit or debit card). If the identification data provided by the consumer at that time matches (or is sufficiently close to) the consumer identification data provided by the consumer to the merchant at the time of payment, then the consumer may take possession of the product, or obtain access to the service. Example services that may be accessed using embodiments of the invention include transit services, tickets for a concert or sporting event, or access to another type of venue.

An example embodiment of the invention will now be described with reference to the included figures. Prior to discussing specific embodiments of the invention, a further description of certain terms is provided to enable a better understanding of embodiments of the invention.

A "payment device" or "portable consumer device" may include any suitable device capable of being used to provide payment for a transaction. For example, a payment device can take the form of a card such as a credit card, debit card, charge card, gift card, or any combination thereof. The card or substrate may include a contactless element in which is stored payment account data. Further, a payment device may take the form of a device other than a card which incorporates a data storage element in which is contained data that may be used to conduct a payment transaction. Examples of such devices include mobile phones, PDAs, portable computing devices, etc.

A "payment processing network" (e.g., VisaNet™) is one or more entities (e.g., data processing elements) that are capable of communication and data transfer over a suitable communication network or networks, and which is used to perform operations involved in the processing of payment transactions. A payment processing network may include data processing subsystems, networks, and operations used to support and deliver transaction authorization services, consumer authentication services, exception file services, and clearing and settlement services. An exemplary payment processing network may include VisaNet™. Payment processing networks such as VisaNet™. are able to process credit card transactions, debit card transactions, and other types of commercial transactions. VisaNet™ in particular, includes a VIP system (Visa Integrated Payments system) which processes authorization requests and a Base II system which performs clearing and settlement services.

An "authorization request message" may be generated by an entity (e.g., a merchant) that is part of or in communication with a payment processing network as part of the process of obtaining authorization to conduct a payment transaction. Such a message can include a request for authorization to conduct the payment transaction and may include an issuer account identifier. The issuer account identifier may be a payment card account identifier associated with a payment card. The authorization request message may request that an issuer of the payment card (or payment device) authorize a transaction. An authorization request message according to an embodiment of the invention may comply with ISO 8583, which is a standard for systems that exchange electronic transactions made by cardholders using payment cards.

An "authorization response message" can be a message that includes an authorization code, and may typically be produced by an issuer in response to receiving and processing an authorization request message as part of determining whether to approve or deny a requested transaction. Other entities or elements that are part of or in communication with a payment processing network may also be involved in determining whether to approve or deny a requested transaction.

A "server computer" can be a powerful computer or a cluster of computers. For example, the server computer can be a large mainframe, a minicomputer cluster, or a group of servers functioning as a unit. In one example, the server computer may be a database server coupled to a Web server.

A "terminal" (e.g. a point-of-service (POS) terminal) can be any suitable device configured to allow a consumer or merchant to initiate (and in some cases, process) a payment transaction, such as a credit card or debit card transaction, a load transaction, or an electronic settlement transaction. The terminal may include optical, electrical, or magnetic elements configured to read data from portable consumer devices such as smart cards, keychain device, cell phones, payment cards, security cards, access cards, and the like.

An "acquirer" is a business entity (e.g., a commercial bank) that typically has a business relationship with a merchant and receives some or all of the transactions from that merchant.

An "issuer" is a business entity which issues a card or other form of payment device to a consumer or card holder. Typically, an issuer is a financial institution.

FIG. 1 is a diagram illustrating the components and operation of a load network that may be used, adapted for use, or used in conjunction with a payment processing network in implementing an embodiment of the invention. Note that in some embodiments, the load network may include some of the same elements as a payment processing network and may operate similarly with respect to certain functions or operations.

FIG. 1 shows a user (typically a consumer) 102, a load agent (typically a merchant) 106, an Acquirer 110, a Payment Processing Network 114, and an Issuer 116. Acquirer 110 and Issuer 116 can communicate through Payment Processing Network 114. Load agent 106 includes at least one point of service (POS) terminal 108 and can communicate with Acquirer 110, Payment Processing Network 114, and Issuer 116.

User 102 may be a consumer of goods and/or services. User 102 may be associated with (e.g., use) a portable consumer device 104 that is used to make a payment for goods, products, or services. Example portable consumer devices 104 include credit cards, debit cards, and prepaid cards (e.g., gift cards or payroll cards). Portable consumer device 104 may also be in a form factor other than a card. For example, portable consumer device 104 may be hand-held and compact so that it can fit into a consumer's wallet and/or pocket (e.g., pocket-sized). Examples of portable consumer devices may include cellular phones, personal digital assistants (PDAs), pagers, security cards, access cards, smart media, transponders, and the like. The portable consumer devices may interface with point of service (POS) terminals using any suitable mechanism including any suitable electrical, magnetic, or optical interfacing system. For example, a contactless system such as an RF (radio frequency) device recognition system or contact system such as a magnetic stripe may be used to interface with a POS terminal containing a contactless reader or a magnetic stripe reader, respectively.

Load agent 106 can be one of many load agents in a load network or system. For example, load agent 106 may be a merchant with one or multiple POS terminals. Exemplary load agents can include drugstores, grocery stores, gas stations, hardware stores, etc. Load agents can include businesses that do not have an affiliation with each other, and may simply be a business that has normal POS terminals that are configured to process credit card or debit card transactions. Load agents may be merchants that enter into an agreement with other merchants or service providers (such as transit system operators) to enable consumers to purchase products or services from those merchants or service providers by using the services of the load agent.

Load agent 106 may have any suitable number and/or type of POS terminals. Suitable POS terminals include stand-alone kiosks, check-out lanes or check-out counters at merchants, etc. Suitable POS terminals may include terminals that are configured to process credit card or debit card transactions. The POS terminals may have optical, electrical, or magnetic readers that can read data from portable consumer devices.

As shown in FIG. 1, the overall system may include an Acquirer 110 and an Issuer 116. Acquirer 110 may be a commercial bank that is associated with load agent 106. Load agent 106 may have one or more Acquirer deposit accounts 112. Issuer 116 is an entity that provides the user or consumer with the portable consumer device and manages the account or accounts associated with the device.

Payment Processing Network 114 may comprise or use a payment processing network such as VisaNet™. Payment Processing Network 114 and any communication network that communicates with Payment Processing Network 114 may use any suitable wired or wireless network, including the Internet. Payment Processing Network 114 may be adapted to process debit card or credit card transactions, in addition to processing transactions associated with the loading and/or reloading of value on a payment device or portable consumer device.

As noted, a payment processing network (e.g., VisaNet) may include a plurality of data processing devices, such as computers, servers, or central processing units that are interconnected by a suitable network or networks. The data processing devices may be used to support authorization, clearing, and settlement services for users of the payment processing network, where these services may be applied as needed to various types of transactions and typically are described as:

Authorization—the necessary functions or operations to enable an issuer to approve or decline a transaction before a purchase is finalized or cash is disbursed;

Clearing—the necessary functions or operations to support the process of delivering a transaction from an acquirer to an issuer for posting to a consumer's account; and Settlement—the necessary functions or operations to support the process of calculating and determining the net financial position of each party for all transactions that are cleared.

The authorization, clearance, and settlement functions are typically performed by exchanging messages between the elements of the payment processing network and the entities that interact with that network (such as the acquirer and issuer). Depending on the function being performed and the type or format of a message, a message may contain information about the transaction (e.g., the date, type of transaction, amount of transaction, merchant, etc.), information about the consumer conducting the transaction (e.g., the consumer's account number, security code, etc.), information about the merchant with whom the consumer is conducting the transaction (e.g., a merchant code or other identification, etc.), and information about the status of the processing of the transaction (e.g., a flag or indicator of whether the transaction has been approved or declined, etc.). A message may also include information about the transaction that is used by the elements of the payment processing network and/or the entities that interact with that network to perform their respective data processing functions (e.g., a risk or fraud score, etc.). The messages typically have a format or structure in which certain information is found in a defined field or region of the message. In addition to one or more defined fields, a message may also include one or more discretionary fields in which other forms or types of data may be placed.

In a payment processing network such as VisaNet, the primary components are VisaNet Interchange Centers (VICs), VisaNet Access Points (VAPs) and other network connections, and Processing Centers. These components are arranged in an architecture that provides consumers, merchants, acquirers, and issuers with the services needed for authorization, clearance, and settlement of transactions.

A VisaNet Interchange Center (VIC) is a Visa data processing center. Each VIC houses the computer systems that perform VisaNet transaction processing. The VIC serves as the control point for the telecommunications facilities of the VisaNet Communications Network, which comprises high-speed leased lines or satellite connections based on IBM SNA and TCP/IP protocols.

A VisaNet Access Point (VAP) is a Visa-supplied computer system (located at a processing center) that provides the interface between the center's host computer and the VIC. The VAP facilitates the transmission of messages and files between the processing center host and the VIC, supporting the authorization, clearing, and settlement of transactions.

Visa also provides other connection options for interacting with VisaNet that do not require VAPs.

A processing center is a data processing facility operated by (or for) an issuer or an acquirer. The processing center houses card processing systems that support merchant and business locations and maintain cardholder data and billing systems. As a form of redundancy, each processing center communicating with VisaNet is linked to two VICs. Processing centers are connected to the closest, or primary, VIC. If one VIC experiences system interruptions, VisaNet automatically routes members' transactions to a secondary VIC, ensuring continuity of service. Each VIC may also linked to one or more of the other VICs. This link enables processing centers to communicate with each other through one or more VICs. Processing centers can also access the networks of other card programs through the VIC.

A VisaNet Interchange Center typically houses the following VisaNet systems that provide both online and offline transaction processing:

(1) the VisaNet Integrated Payment (V.I.P.) System, which includes the BASE I System and the Single Message System (SMS);
(2) the BASE II System; and
(3) the VisaNet Settlement Service (VSS).

Together, these VisaNet systems perform part or all of the transaction authorization, clearing, and settlement functions.

The V.I.P. System is the primary online transaction switching and processing system for all online authorization and financial request transactions that enter VisaNet. V.I.P. has one system that supports dual-message processing (authorization of transactions is requested in a first message, while financial clearing information is sent in a second message), and another system that supports single-message processing (the processing of interchange card transactions that contain both authorization and clearing information in a single message). In both cases, settlement occurs separately.

BASE I is the component of the V.I.P. System that processes authorization-only request messages online. Authorization request messages are typically the first messages sent in dual-message processing (where BASE II clearing messages are the second messages sent in dual-message processing). The BASE I component of the V.I.P. System supports online functions, offline functions, and the BASE I files. BASE I files include the internal system tables, the BASE I Cardholder Database, and the Merchant Central File. The BASE I online functions include dual-message authorization processing. BASE I online processing involves routing, cardholder and card verification, and stand-in processing (STIP), plus related functions, such as Card Verification Value (CVV) validation, PIN verification, and file maintenance.

A bridge from BASE I to SMS makes it possible for BASE I members to communicate with SMS members and to access the SMS gateways to outside networks. The BASE I offline functions include BASE I reporting and the generation of Visa Card Recovery Bulletins. BASE I reporting includes authorization reports, exception file and advice file reports, and POS reports.

The Single Message System (SMS) component of the V.I.P. System processes full financial transactions. Full financial transactions contain both authorization and clearing information. Because the authorization and clearing information is contained in one message, this form of processing is referred to as single-message processing. SMS also supports dual-message processing of authorization and clearing messages, communicating with BASE I and accessing outside networks, as required, to complete transaction processing.

SMS supports online functions, offline functions, and the SMS files. The SMS files comprise internal system tables that control system access and processing, and the SMS Cardholder Database, which contains files of cardholder data used for PIN verification and for stand-in processing (STIP) authorization. The SMS online functions perform real-time cardholder transaction processing and exception processing. This processing supports both authorizations and full financial transactions. In addition, SMS supports the delivery of transactions to the BASE II System for members that use dual-message processing. SMS also accumulates reconciliation totals, performs activity reporting, and passes activity data to VisaNet, which supports settlement and funds transfer processing for SMS. VisaNet handles settlement and funds transfer as an automatic follow-up to SMS transaction processing. The SMS offline systems process settlement and funds transfer requests and provide settlement and activity reporting. They also support an offline bridge to and from BASE II for those Visa and Plus clearing transactions that are sent between an SMS member and a BASE II member.

The BASE II System is an international electronic batch transaction clearing system for the exchange of interchange data between acquirers and issuers. The system calculates interchange fees between members. BASE II performs the second part of dual-message processing. Through a BASE I System connection, members submit authorization messages, which are cleared through a VisaNet connection to BASE II. A bridge to the V.I.P. System permits interchange between BASE II processing centers and SMS processing centers.

The VisaNet Settlement Service (VSS) consolidates the settlement functions of SMS and of BASE II, including Interlink, into a single service for all products and services. Members and processors receive settlement information from SMS and from BASE II in a standardized set of reports. VSS provides flexibility in defining financial relationships, in selecting reports and report destinations, and in establishing funds transfer points. VisaNet processes interchange transactions for SMS and for BASE II through separate systems.

As noted, information passes between members and V.I.P. in the form of messages. For use with VisaNet, BASE I and SMS messages may be variations of the International Organization for Standardization (ISO) 8583 message, the international standard for the format of financial messages. Each message contains bit maps that specify the data fields that appear in the message, a message type identifier, and those fields that are needed for the specific function intended. The message header contains basic message identifiers and routing information, along with message processing control codes and flags. The message type identifier specifies the message class and the category of function. For instance, 0100 indicates an authorization request. A bit map specifies which data fields are in a message. In addition to a primary bit map, messages can include second and third bit maps. Each map contains 64-bit fields, corresponding to the number of possible fields in a message. The data fields contain the information needed to process a message.

In a conventional use case of the load network components shown in FIG. 1, a user/consumer wishes to add funds to (i.e., load or re-load) a portable consumer device such as a prepaid card. To perform this function the consumer visits a load agent and presents the load agent with funds, typically in the form of cash. The consumer then swipes their prepaid card, thereby providing account data to the POS terminal. The load agent's data processing system (which interfaces with the POS terminal) then generates a load message which is transported to the Acquirer and over the Payment Processing Network to the Issuer of the consumer's card or other form of portable consumer device. The account associated with the card or portable consumer device is credited with the funds and the information stored on the card or device may be updated to reflect the new balance.

Note that although identified as a Payment Processing Network in FIG. 1, the load network may include parts of, be the same as, or be separate from a standard payment processing network that is used to process payment transactions conducted using credit cards or debit cards. In some cases, the load network may be referred to as a payment processing network herein because in some embodiments the same network may be used for both account loading and for payment transaction processing operations. Note further that the load operation described with reference to FIG. 1 involves a transaction in which funds are provided to a merchant and in return, the consumer device or account of the consumer who provided the funds is credited with the amount of the funds. As will be described, in some embodiments of the invention funds provided by a consumer (either cash or from an account associated with a credit card, debit card, or prepaid card, for example) are used to provide a credit to an account of a third party (i.e., neither the consumer or the merchant/load agent) as part of a transaction to purchase products or services provided by that third party.

Figure 2:
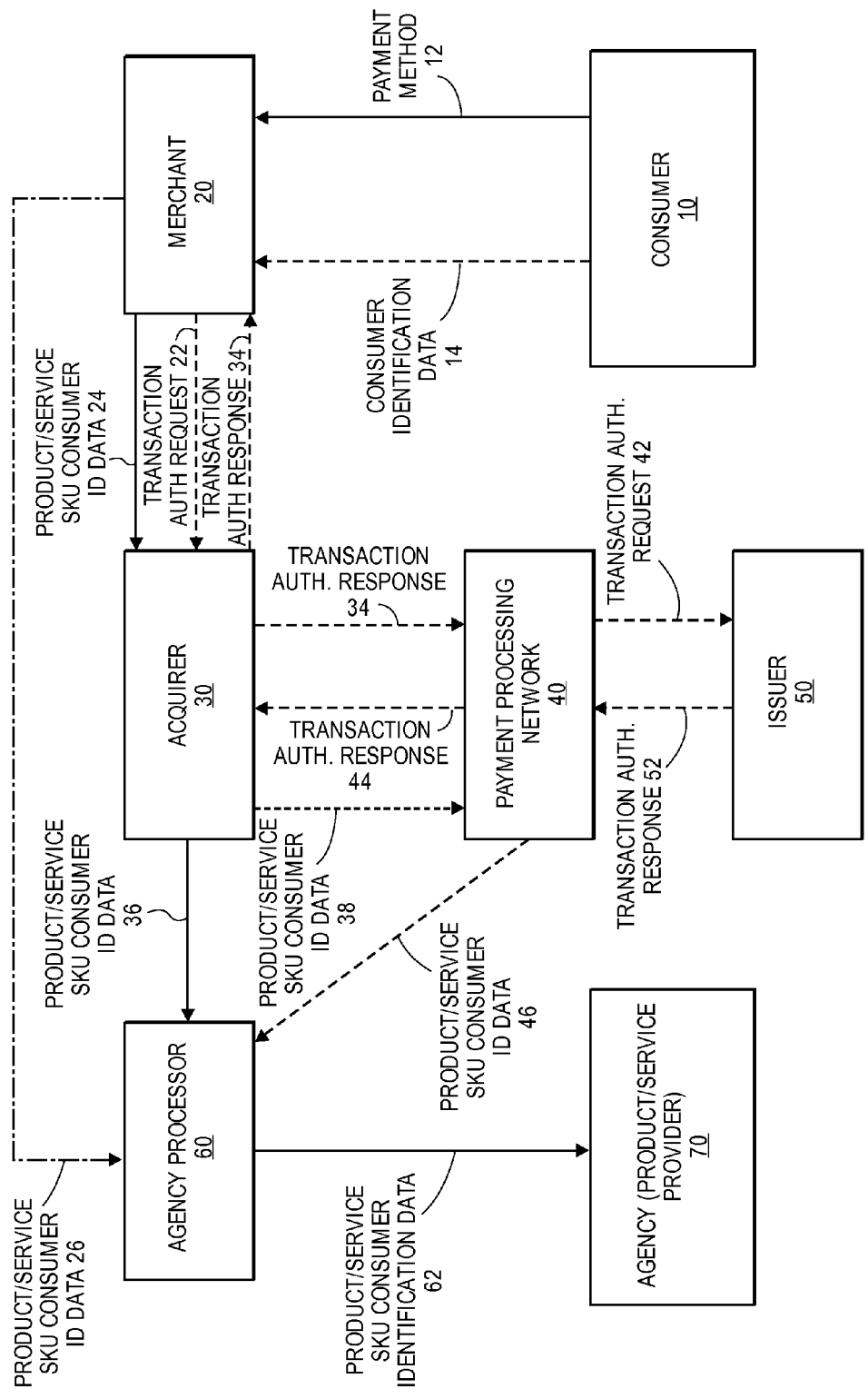
FIG. 2 is a diagram illustrating the primary functional elements and process flow that may be used to implement an embodiment of the invention.

FIG. 2 is a diagram illustrating the primary functional elements and process flow that may be used to implement an embodiment of the invention. As shown in the figure, in some embodiments a Consumer 10 visits a Merchant 20 in order to arrange to purchase a product or a service from a third party (identified as "Agency (Product/Service Provider) 70" in the figure). Consumer 10 provides payment for the purchase in the form of either cash or a payment device (which may be a credit card, debit card, or other form of device linked to a consumer payment account). The payment is indicated by "Payment Method 12" in the figure. If Payment Method 12 is not cash, then approval of the purchase transaction may be required. In such a situation Merchant 10 generates a message that serves as a request for Issuer 50 to authorize the proposed transaction (identified as "Transaction Auth. Request 22" in the figure). The Transaction Auth. Request 22 message is provided by the Merchant's data processing system to the Merchant's Acquirer 30, which manages the Merchant's account. Acquirer 30 may process the authorization request message and then route the processed message (identified as element 32) to Payment Processing Network 40.

Payment Processing Network 40 is typically a group of servers or data processing devices connected by a suitable data communications network that is used to process, route, perform transaction approval and fraud detection functions, and participate in the settlement and clearance of payment transactions. Payment Processing Network 40 may be operated by a card association such as Visa (e.g., VisaNet). Payment Processing Network 40 may process message 32 before providing the processed message (identified as "Transaction Auth. Request 42" in the figure) to Issuer 50. Issuer evaluates the request for the transaction and determines if authorization will be granted. After processing, Issuer 50 generates a response message that includes an indication of whether the transaction has been approved or denied (identified as "Transaction Auth. Response 52" in the figure).

Transaction Auth. Response Message 52 is routed from issuer 50 to Payment Processing Network 40 and from Payment Processing Network 40 (after additional processing if customary as part of the approval process) to Acquirer 30 (identified as "Transaction Auth. Response 44" in the figure). The response message is then routed from Acquirer 30 to Merchant 20 (identified as "Transaction Auth. Response 34" in the figure). If the transaction is approved, then Merchant 20 may inform Consumer 10 and proceed with the overall transaction. If the transaction is denied, then Merchant 20 may inform Consumer 10 and request another form of payment.

After receiving cash or obtaining approval of a payment transaction using a payment account of Consumer 10, Merchant 20 may request identification data (identified as "Consumer Identification Data 14" in the figure) from Consumer 10. If cash is used for payment, then Consumer 10 may be asked to "swipe" a credit card, debit card, membership card, or other form of identification. The card or other form of identification is intended to provide data that may be used to identify Consumer 10 to Agency 70 when Consumer 10 desires to pick up the purchased product or obtain the desired service. Typically, a consumer's credit card, debit card, or membership card will include a magnetic stripe or contactless element that stores an account or identification number. By capturing that information at the Merchant location it may be provided to Agency 70 so that Consumer 10 may identify themselves to Agency 70 by swiping their card when at agency's location (or in the case of some types of consumer devices, by interacting with a device reader, etc.).

Note that if a payment device such as a credit card or debit card is used to provide payment, then the number of the account associated with the card may be used as Consumer Identification Data 14. In such a case Consumer 10 may not need to provide identification data 14 as part of a separate process.

After obtaining payment for the transaction (which as noted may include a transaction approval process) and Consumer Identification Data 14, Merchant 20 generates a load network message that includes an identifier for the desired product or service, and some form of the Consumer Identification Data 14. This message (identified as "Product/Service SKU Consumer ID Data 24" in the figure) is in a format that is routable (i.e., transportable) over the load network. Note that the load network may include parts of, be the same as, or be associated with a network used to route messages for approval of payment transactions.

The Product/Service SKU Consumer ID Data 24 message is provided to Agency Processor 60 which operates to receive and process messages for Agency 70. Agency Processor 60 may be a server, group of servers, or other data processing apparatus that are operated by Agency 70 (and in which case may be part of Agency 70) or be operated by another entity for Agency 70. For example, Agency Processor 60 may be a financial institution or other entity that manages an account for Agency 70 or for several such providers of products or services. As another example, Agency Processor 60 may be a back-end web service that processes orders for Agency 70, with those orders being routed to Agency Processor 60 as a result of the data contained in the message (as will be described in greater detail with reference to FIGS. 2 and 3, and the discussion of the message data format (where the data that would normally be used to represent an Issuer (the BIN) may instead be used to identify the provider of the purchased product or service)). Further, upon receipt of the message, Agency Processor 60 may generate a notification to provide Agency 70 with confirmation of the purchase of a specific item (e.g., a transit system pass) by a consumer who may be identified by the provided consumer identification data.

Note that the Product/Service SKU Consumer ID Data message may be provided to Agency Processor 60 by any suitable transport channel. Examples include via Acquirer 30 (in which case message 24 is received by Acquirer 30 and routed to Agency Processor 60 as message 36), via Payment Processing Network 40 (in which case message 24 is received by Acquirer 30 and routed to Payment Processing Network 40 as message 38, followed by being routed to Agency Processor 60 as message 46), or directly routed from Merchant 20 to Agency Processor 60 (as message 26).

Agency Processor 60 receives the message containing the data identifying the purchased product or service, along with the data identifying the consumer. Agency Processor 60 may process the received message as part of performing fulfillment, inventory management, decryption, decoding, or other data processing operations or functions for Agency 70. Agency Processor 60 then provides Agency 70 with information regarding the product or service being purchased by Consumer 10, along with data that may be used to identify the consumer (identified as "Product/Service SKU and Consumer Identification Data 62" message in the figure).

When Consumer 10 visits Agency 70 to obtain the product or service, Agency 70 may ask Consumer 10 to provide identification. In response, Consumer 10 may swipe a credit card, debit card, membership card, or other form of identification (note that other forms of providing the requested identification data may be used, such as showing Agency 70 the card, etc.). Agency 70 may then compare the identification data provided by Consumer 10 directly to that contained in message 62. This may require further processing to decrypt, decode, re-format, or otherwise interpret the data in message 62 or as provided by Consumer 10 directly. After any such processing, if the identification data match (or are sufficiently similar), then Consumer 10 is provided with the product or service. This may include providing Consumer 10 with access to a venue such as a concert hall, transit system, sporting event, etc.

Figure 3:
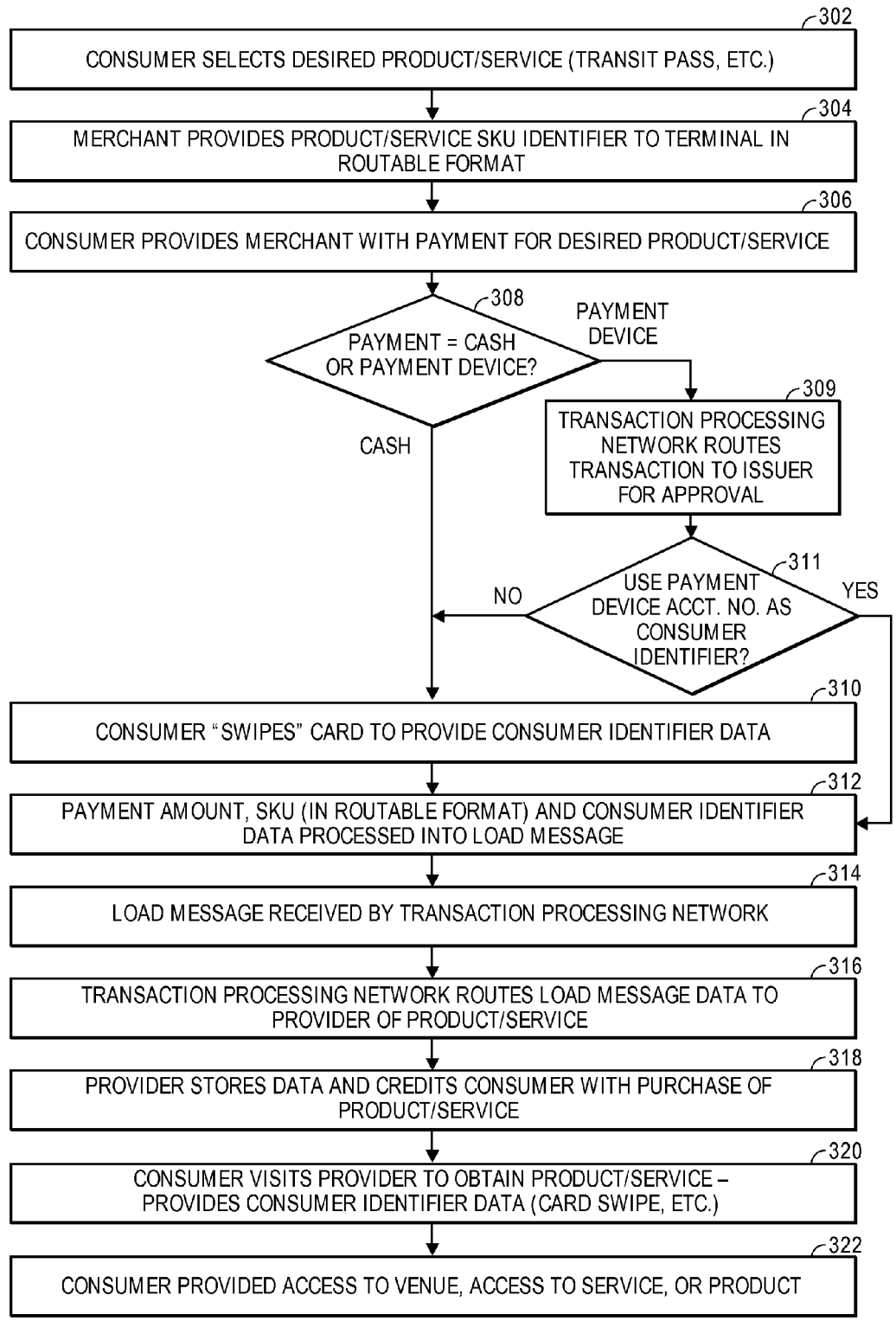
FIG. 3 is a flowchart or flow diagram illustrating a method or process for implementing an embodiment of the invention.

FIG. 3 is a flowchart or flow diagram illustrating a method or process for implementing an embodiment of the invention. As shown in the figure, a consumer visits a merchant and selects a product or service that they desire to purchase (stage or step 302). This may be done by the consumer viewing a catalog or other listing of available products or services. In some embodiments, each available product or service is associated with an identifier. In some embodiments this identifier is in a format that enables it to be routed over a payment processing network or load network (which may be part of, the same as, or associated with a payment processing network). For example, in some embodiments the identifier may be a product SKU code that is expressed in a BIN/PAN format, such as that used to identify a consumer payment account. In such a format, the BIN data represents an Issuer (or in the present case, a provider of the desired product or service), and the PAN data represents a consumer account number (or in the present case, an identifier of the product or service that is unique as far as the provider is concerned). In accordance with an embodiment, particular BIN ranges may be established which each correspond to a different product or service category associated with a product or service provider. In the context of a transit pass, each BIN range may correspond to a different fare product associated with a transit provider. For example BIN 4XXXXX 00 to 4XXXXX 01 may correspond to a 30 day transit pass for a particular transit provider valued at $100 per pass; and BIN 4XXXXX 01 to 4XXXXX 02 may correspond to a seven day transit pass for the particular transit provider valued at $35 per pass. In some embodiments, the Merchant may scan or otherwise capture the SKU code from a catalog by using a bar code scanner or other suitable capture device (stage or step 304).

The scanned or captured SKU code may be entered into a terminal at the Merchant's location. The consumer then provides the Merchant with payment for the desired purchase (step or stage 306). The payment may be in the form of cash or may be provided using a payment device such as a credit card or debit card (step or stage 308). If the payment is provided by means of cash, then the process proceeds along the path from step or stage 308 labeled "Cash" to step or stage 310. In such a situation no approval of the transaction is required. However, if the payment is performed using a payment device, then the process proceeds along the path from step or stage 308 labeled "Payment Device" to step or stage 309.

At step or stage 309, the transaction processing network (e.g., Payment Processing Network 40 of FIG. 2) is used to route the proposed transaction to an Issuer for authorization (e.g., in accordance with the messages and operations discussed with reference to elements 22, 32, 42, etc. of FIG. 2). Once approval is obtained (or if cash is used to provide payment) the consumer may be asked to provide identification data. In the case of using a payment device the consumer may be asked if they wish to use the payment device identifier (such as the BIN/PAN of the payment device) as the consumer identifier (step or stage 311). If the consumer wishes to use the payment device identifier as the consumer identifier, then the process proceeds along the path from step or stage 311 labeled "Yes" to step or stage 312.

If the consumer does not desire to use the payment device identifier as the consumer identification data, then the process proceeds along the path from step or stage 311 labeled "No" to step or stage 310. Similarly, if the consumer provides payment using cash, then the process has proceeded to step or stage 310. At step or stage 310 the consumer is asked to provide the requested consumer identification data. This may be provided by any suitable means, such as by swiping a credit card, debit card, membership card, or other form of identification. As noted, the card or other form of identification is intended to provide data that may be used to identify the consumer to the provider of the product or service when the consumer desires to pick up the purchased product or obtain the desired service. Typically, a consumer's credit card, debit card, or membership card will include a magnetic stripe or contactless element that stores an account or identification number. By capturing that information at the Merchant location it may be provided to the product or service provider so that the consumer may identify themselves by swiping their card when at the provider's location.

Note that although the consumer's payment device or other form of identification (e.g., credit card, debit card, membership card, etc.) is used to provide the consumer identification data, the actual identification data provided to the product or service provider may be a processed, encrypted, or encoded version of this data. For example, the consumer identification data provided to Agency 70 of FIG. 2 may be a hash, encryption, or other processed form of the consumer's payment account number, driver's license number, social security number, etc. This form of the consumer identification data is provided to the provider of the product or service where it may be subjected to processing in order to permit the provider to compare the consumer identification data they receive to that provided by the consumer (from a card swipe or interaction with a consumer device, for example).

At step or stage 312 the Merchant's data processing system (e.g., a point of service terminal or computing device connected to such a terminal) generates a message for the load network. This message is in a format that is routable (i.e., transportable) over the network. As noted, the load network may include parts of, be the same as, or be otherwise associated with a payment processing network. An example load network that may be used to implement all or a portion of an embodiment of the invention is the Visa ReadyLink Network which may utilize SMS (short message service) or other formats of messages to enable a consumer to load a prepaid card, gift card, payroll card, or other instrument by visiting a merchant and providing payment to that merchant. In some cases the ReadyLink Network may utilize some of the same elements as the VisaNet network which is used to process payment transactions, such as those conducted using a credit card or debit card.

In some embodiments of the invention the Merchant's data processing system generates a message (or messages) in a routable format that includes at least the following information: (a) an identification of the product or service being purchased by the consumer (e.g., in a routable format such as a BIN/PAN format in which the BIN data identifies the provider of the purchased item and the PAN data identifies the actual item in a manner so that the provider can uniquely identify the item); and (b) consumer identification data (e.g., the PAN for a consumer account, a processed version of the PAN (a hash or encrypted form), another form of identification data that may have been processed to place it into the proper format, etc.). Note that other data may be included in the load message or messages; for example the message or messages may contain data specifying the Merchant, the amount of the payment for the product or service, a code or codes that represent some aspect of the transaction, etc.

The message (or messages) generated by the Merchant's data processing system are provided to the load network (step or stage 314 and which, as noted, may be part of or associated with a payment transaction processing network, such as Visa-Net). The network routes the load message (or messages) to the provider of the product or service that the consumer wishes to purchase (step or stage 316). With reference to FIG. 3, this would typically be the Agency Processor 60 or the Agency 70. The message (or messages) may be routed directly to the Agency Processor (as illustrated by message 26 of FIG. 2), they may be routed via the Acquirer and from the Acquirer to the Agency Processor (as illustrated by messages 24 and 36 of FIG. 2), or they be routed via the Acquirer to the Payment Processing Network and from the Payment Processing Network to the Agency Processor (as illustrated by messages 24, 38, and 46 of FIG. 2).

After receipt and processing of the message (or messages), Agency Processor 60 or Agency 70 credits Consumer 10 with the purchase of the desired products or services (step or stage 318). This may be accomplished by processing of the received message (or messages) to identify the SKU or other form of identifier for the purchased item or service. An account associated with that item or service may be then be credited with the purchase price. Note that the Agency Processor 60 or Agency 70 also processes the received message (or messages) to extract the consumer identification data (which may require further processing to convert it to a usable form, such as decrypting, etc.). The consumer identification data and data identifying the purchased item or service may be stored in a suitable data storage device or database so that Agency 70 can access the data when the consumer visits Agency 70 and use it to confirm that the consumer is entitled to receive the item or service.

Next, the consumer visits Agency 70 to obtain the desired product or service. The consumer may visit a storefront operated by Agency 70 or other suitable means or structure for delivering the purchased item or service (such as a kiosk, stand, etc.). The customer identifies the item or service they have purchased and also provides Agency 70 with the consumer identification data (step or stage 320). In some embodiments, the consumer identification data may be provided by swiping the consumer's credit card, debit card, membership card, or other form of identification. As noted, the consumer identification data received by Agency Processor 60 or Agency 70 in the message (or messages) may require further processing to permit comparison with the data provided by the consumer at the Agency site; conversely, the data provided by the consumer at the Agency site may require further processing to permit comparison with the consumer identification data received by Agency Processor 60 or Agency 70 in the message or messages. If the consumer identification data provided by the consumer at the Agency site (or data derived from that data) matches or properly compares to the consumer identification data contained in (or derived from that contained in) the message or messages, then the consumer is provided with the product or service (step or stage 322). In some embodiments this may entail enabling the consumer to access a transit system, sporting event, museum, or concert.

Note that comparison between the consumer identification data contained in the message(s) and that provided to the provider by the consumer may entail processing of one or both sets of data prior to the comparison. This may be required to interpret an encoded form of the data, to decrypt the data, etc. Further, the comparison process may be one that determines if there is an exact match between the data sets, may determine if certain data contained in the data sets matches or is sufficiently close, or may base a successful comparison on any other suitable measure, heuristic, algorithm, or process.

Figure 4:
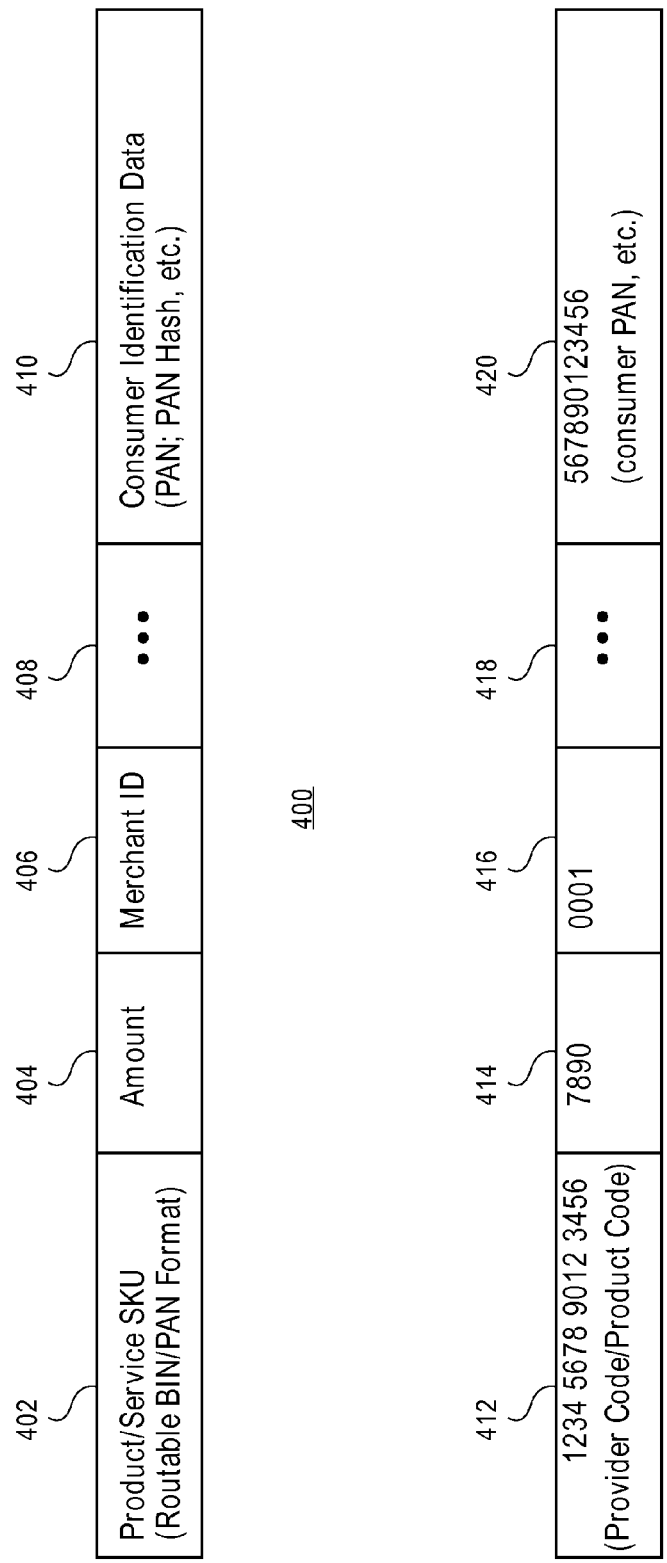
FIG. 4 is a diagram illustrating an example of a data format and message data for the message sent from the Merchant to a load network that may be used to implement an embodiment of the invention.

FIG. 4 is a diagram illustrating an example of a data format 400 and message data 401 for the message sent from the Merchant to a load network that may be used to implement an embodiment of the invention. It is noted that the format and data depicted in FIG. 4 are for purposes of example and are not intended to restrict or otherwise limit the types of message formats and data that may be used to implement the inventive methods, functions, operations, and processes. The actual message or messages used to perform one or more of the functions or operations described with reference to embodiments of the invention may differ in that they include more data, less data, different data, a different definition of the data fields, or a different placement of data within the message.

As shown in the figure, an example data format may include a data field 402 identifying the product or service being purchased by the consumer. As described, this data may be in a routable format that is transportable over a load network or payment processing network (such as VisaNet) and may include alphanumeric characters. For example, a suitable format for the identification data 402 is the BIN/PAN format used to represent an Issuer/Account No. when processing payment transactions (or the destination account for a load operation). In the present situation, the BIN may be a data string representing the Agency (the provider of the purchased item or service) and the PAN may be a data string uniquely identifying the purchase to the provider (shown as data 412). Message 400 may also include a data field 404 indicating the amount of the purchase (and corresponding data 414 which may include a currency code in addition to an amount), a data field 406 containing an identifier for the merchant to whom the consumer provided payment (with corresponding data 416), and a field or fields 408 (or 418) containing other data or information used in the routing or processing of the message, or in the conduct of a transaction (illustrated as " . . . " in the figure, and which may include flags, codes, indicators, etc. used to route or process a message or transaction). Further, message 400 contains a field or region in which the consumer identification data 410 is provided. This is the identification data (or data derived from that data) that was provided by the consumer to the merchant when the consumer made the purchase. As noted, the consumer identification data may be an account number from a credit card or debit card (such as data 420), a hash of that account number, an encrypted form of that number, or other suitable data that may be used to identify the consumer by its comparison with data provided by the consumer to the provider of the purchased item or service.

As has been described, by using a routable format to identify the product or service that the consumer is purchasing (a routable SKU code for example), the message (or messages) generated by the merchant may be transported and interpreted by a load network or payment processing network that is used for other purposes. The message(s) have a format and data content that conforms to those typically used with the network but with the routable SKU code typically (though not necessarily) being used in the data field normally used for the BIN/PAN data string that represents the consumer's payment device that is being loaded (in the case of a load transaction) or that is being used to pay for a transaction (in the case of a payment transaction). This permits the message(s) to be processed and routed in the way that a transaction authorization request or load request would normally be handled. However, instead of the message being used to request authorization of a transaction using the consumer's credit card or debit card, or the loading of funds to a consumer account, the message represents an instruction to load or credit the amount of the purchase to an account associated with a specific product or service (and one that is provided by the identified provider, such as the Agency of FIG. 2).

Further, the message(s) contain a field 410 (such as a discretionary data field of a typical transaction message) in which is included data that may be used to identify the consumer when they visit the provider to obtain the product or service. As described, this data may be obtained from the consumer's credit card, debit card, prepaid card, membership card, or other form of identification (such as a driver's license, etc.). The data inserted into field 410 may be the data as read from the consumer's card or may be a processed version of that data, such as an encrypted version to provide additional security. Any suitable form of the data provided by the consumer may be used in data field 410, with the understanding that whatever form is used can be processed to extract data that may be compared to data provided by the consumer when they visit the provider of the product or service (or that the data provided by the consumer to the provider may be processed and compared to that in field 410).

In accordance with an embodiment, existing data fields in transaction messages can be repurposed to carry the data identifying the consumer and the data identifying the provider and the product or service. For example, in the Visa ReadyLink Network, field 2 in a ReadyLink message may be repurposed to include the data identifying the provider and the product or service purchased in a BIN format. Similarly, field 102, which ordinarily includes a number identifying an account or customer relationship in a cardholder transaction, may be repurposed to include the data identifying the consumer which will be used by the consumer to obtain the purchased product or service. Existing fields in messages used in other networks may be similarly repurposed.

Figure 5:
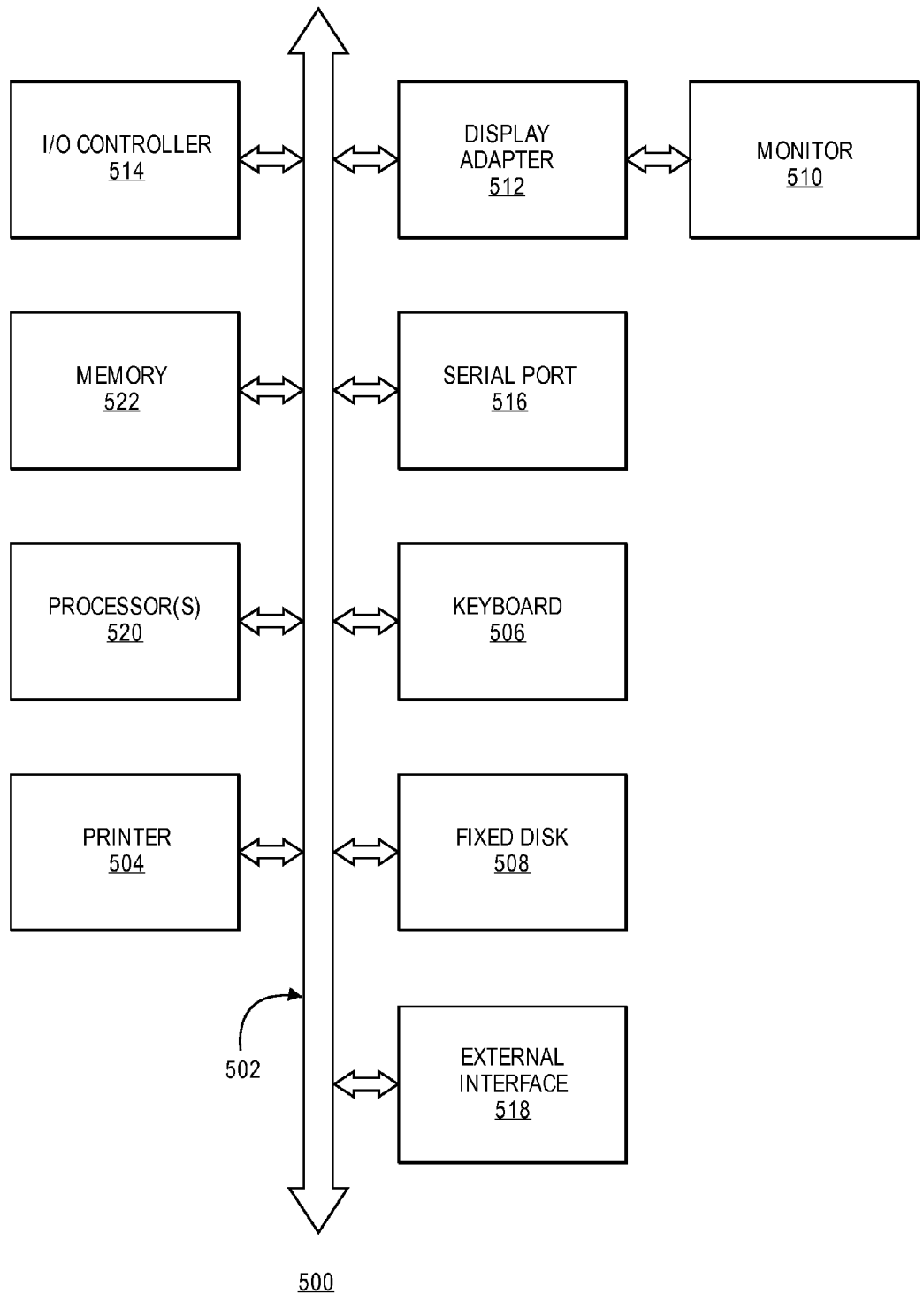
FIG. 5 is a diagram illustrating elements that may be present in a computer device and/or system configured to implement a method and/or process in accordance with some embodiments of the present invention.

In accordance with at least some embodiments, the system, apparatus, methods, processes and/or operations used in implementing an embodiment of the invention may be wholly or partially implemented in the form of a set of instructions executed by one or more programmed computer processors such as a central processing unit (CPU) or microprocessor. Such processors may be incorporated in an apparatus, server, client or other computing device operated by, or in communication with, other components of the system (e.g., a Merchant's POS terminal or data processing system, an Agency or Agency processor, etc.). As an example, FIG. 5 is a diagram illustrating elements that may be present in a computer device and/or system 500 configured to implement a method and/or process in accordance with some embodiments of the present invention. The subsystems shown in FIG. 5 are interconnected via a system bus 502. The subsystems may include one or more of a printer 504, a keyboard 506, a fixed disk 508, or a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 500 to further devices and/or systems not shown in FIG. 5, including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

As described, embodiments of the invention permit a consumer to visit a merchant or load agent and provide payment for a product or service provided by a third party. The payment may be made using cash or a suitable payment device such as a check, credit card, debit card, or prepaid card. If the payment is made using a payment device (i.e., not cash) then an approval process may be needed. This may involve an exchange of transaction authorization request and response messages between the merchant and an Issuer using a load network or payment processing network. Thus, a first aspect of some embodiments of the invention is a transaction in which a consumer provides funds in the form of cash or a payment device to a merchant and the merchant then obtains any necessary approvals before crediting the funds to a merchant account. After obtaining the funds, a second transaction occurs in which the merchant (or more accurately the merchant's data processing system) prepares one or more messages for transmission to the provider of the purchased item or service. This message (or messages) may include an identification of the purchased item or service in a routable format (e.g., a BIN/PAN type format) along with consumer identification data. The consumer identification data may be obtained from the consumer's payment device (e.g., a credit card account number) or another suitable form of identification. The second transaction is used to transfer the received funds (or a portion of the received funds) to an account associated with the purchased item or service that is typically maintained by (or for) the provider (i.e., the Agency of FIG. 2). Thus, in contrast to a typical load transaction, the funds provided by the consumer are not used to load an account of the consumer (such as an account associated with the consumer's prepaid card). Instead the funds are used to transfer an amount to an account that corresponds to the desired item or service being purchased.

Embodiments of the invention may be used to provide consumers with a convenient way to purchase goods, products, or services. The purchase may be initiated at a merchant other than the provider of the purchased item or service. This may be more convenient (in terms of timing or location) then having to visit the provider to make the purchase. The consumer may use cash, a check, a credit card, a debit card, a prepaid card, or other suitable form of payment. For the providers of the goods, products, or services, embodiments of the invention provide a way to increase their sales channel without having to construct a network of dedicated sales terminals or kiosks. Embodiments of the invention therefore solve the technical problem of providing an enhanced sales channel for goods, products, or services without construction of a proprietary distribution network. The inventive solution represents a way to enable use of an existing load network or payment processing network to provide a way for a consumer to purchase an item or service from a third party. Embodiments of the invention also provide a way for the consumer to identify themselves when obtaining the item or service. This further supports a decoupling of the location where the purchase is paid for and the location where the purchased item or service is obtained by the consumer, thereby providing added convenience for the consumer.

For example, a consumer may visit a merchant such as a convenience store to purchase a pass for use with a transit system. When the consumer visits an access gate for the transit system they may swipe their credit card (or debit card, membership card, or other form of identification) to provide the system with suitable identification data. Thus in this example a consumer credit card may be used both as a source of payment and as an access token for the transit system. In another example, a consumer may visit a merchant such as a convenience store and purchase a ticket to a concert, museum, or sporting event. Upon arriving at the concert, museum, or event the consumer may swipe their credit card to obtain access to the venue. In yet another example, a consumer may visit a merchant such as a convenience store and purchase a product that will be picked up at another location. Upon arriving at that location the consumer may swipe their credit card to provide identification data prior to being allowed to take the product.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

As used herein, the use of "a", "an" or "the" is intended to mean "at least one", unless specifically indicated to the contrary.

What is claimed is:

1. A method of enabling a consumer to purchase a transit product, comprising:
   receiving a selection of said transit product from a consumer;
   determining data identifying the selected transit product;
   operating an electronic data processor to generate an electronic message in a format transportable over a payment processing network, wherein the message includes one or more existing fields that are repurposed to include data identifying a transit provider, data identifying the transit product, and data identifying the consumer, wherein generating the electronic message further comprises
      inserting the data identifying the transit provider into a field of the message and in a format used to identify an issuer in a payment transaction authorization request message that is transportable over the payment processing network,
      inserting the data identifying the transit product into a field of the message and in a format used to identify a payment account in a payment transaction authorization request message that is transportable over the payment processing network, and
      inserting the data identifying the consumer into a field of the message and in a format that is transportable over the payment processing network; and
   submitting the generated message to a processing agent associated with the transit provider over the payment processing network, wherein the processing agent associates the selected transit product with the data identifying the consumer.

2. The method of claim 1, wherein the data identifying the consumer is obtained from a prepaid transit device of said consumer.

3. The method of claim 1, wherein the data identifying the consumer is inserted into a discretionary field of the generated message.

4. The method of claim 1, wherein the data identifying the selected transit product and the data identifying the transit provider are obtained by scanning one or more images.

5. The method of claim 4, wherein at least one image is a bar-code.

6. The method of claim 1, wherein the transit product enables the consumer to access or use a transit system of said transit provider.

7. The method of claim 2, wherein when the consumer presents the consumer's prepaid transit device at a transit system of said transit provider, data identifying the consumer is extracted from a prepaid transit card of said consumer and compared with the data identifying the consumer in the message and access to the transit system is granted based on the comparison.

8. The method of claim 1, further comprising receiving payment for the transit product from the consumer at a merchant computer, wherein the merchant computer is associated with an entity other than the transit provider.

9. The method of claim 8, wherein receiving payment for the transit product further comprises:
   obtaining an authorization for a payment transaction to provide the payment for the transit product using the consumer's payment account by exchanging one or more messages over the payment processing network.

10. The method of claim 1, wherein the payment processing network can be used to conduct payment transactions for products or services in addition to the transit product.

11. An apparatus for enabling a consumer to purchase a transit product, comprising:
   an electronic processor programmed to execute a set of instructions; and
   a memory coupled to the electronic processor and storing the set of instructions;
   wherein when executed by the electronic processor, the set of instructions cause the apparatus to
   generate an electronic message in a format transportable over a payment processing network, wherein the message includes one or more existing fields that are repurposed to include data identifying a transit provider, data identifying a transit product purchased by said consumer, and data identifying the consumer, wherein generating the electronic message further comprises inserting the data identifying the transit provider into a field of the message and in a format used to identify an issuer in a payment transaction authorization request message, inserting the data identifying the transit product into a field of the message and in a format used to identify a payment account in a payment transaction authorization request message, and inserting the data identifying the consumer into a field of the message; and submitting the generated message to a processing agent associated with the transit provider over the payment processing network, wherein the processing agent associates the transit product with the data identifying the consumer.

12. The apparatus of claim 11, wherein the data identifying the consumer obtained from a prepaid transit device of said consumer.

13. The apparatus of claim 11, wherein the set of instructions further cause the apparatus to obtain the data identifying the provider of the product or service and the data identifying the product or service by receiving that data from an image representing that data.

14. The apparatus of claim 13, wherein the image is a bar-code.

15. The apparatus of claim 11, wherein the transit product enables the consumer to access or use the transit provider's transit system.

16. The apparatus of claim 11, wherein the data identifying the consumer is inserted into a discretionary field of the generated message.

17. The apparatus of claim 12, wherein when the consumer presents the consumer's prepaid transit device at a transit system of said transit provider, data identifying the consumer is extracted from a prepaid transit card of said consumer and compared with the data identifying the consumer in the message and access to the transit system is granted based on the comparison.

18. The apparatus of claim 11, wherein the set of instructions further cause the apparatus to receive payment for the transit product from the consumer at a merchant computer, wherein the merchant computer is associated with an entity other than the transit provider.

19. The apparatus of claim 18, wherein receiving payment for the transit product further comprises:

obtaining an authorization for a payment transaction to provide the payment for the transit product using the consumer's payment account by exchanging one or more messages over the payment processing network.

20. The apparatus of claim 11, wherein the payment processing network can be used to conduct payment transactions for products or services in addition to the transit product.

* * * * *